Oct. 31, 1950     D. E. WIEGAND     2,528,290
METHOD OF AND MEANS FOR MEASURING TRANSFERS
Filed April 18, 1947
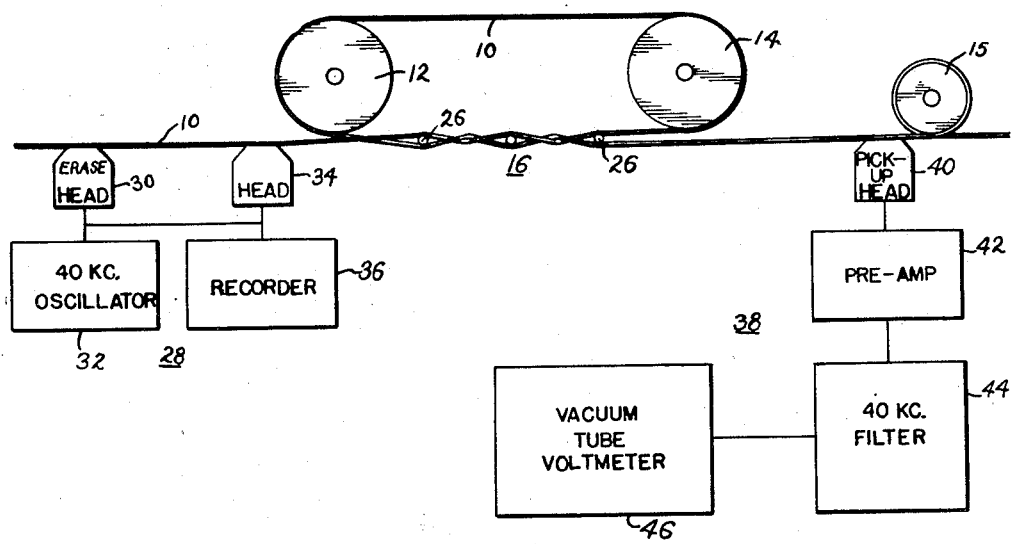
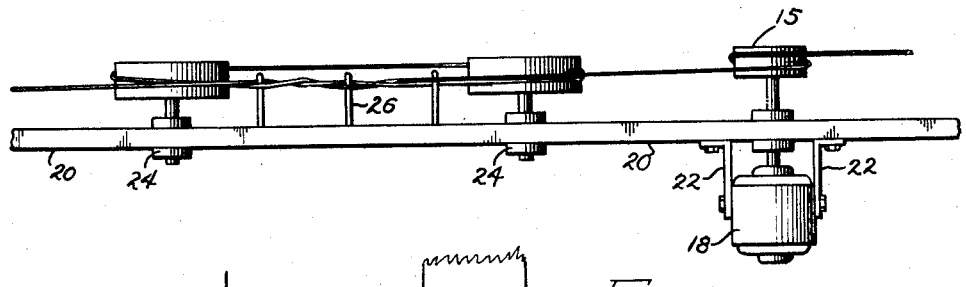
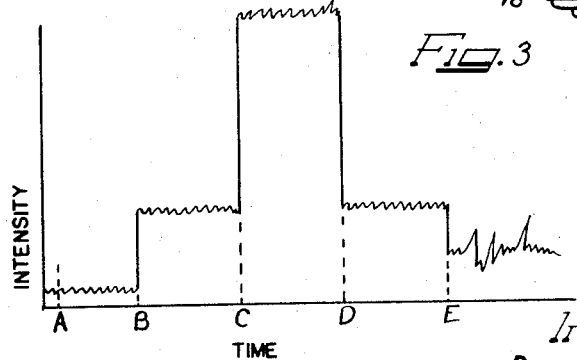
Inventor
DAVID E. WIEGAND Patented Oct. 31, 1950

2,528,290

UNITED STATES PATENT OFFICE 2,528,290

METHOD OF AND MEANS FOR MEASURING TRANSFERS

David E. Wiegand, Villa Park, Ill., assignor to Armour Research Foundation of Illinois Institute of Technology, Chicago, Ill., a corporation of Illinois Application April 18, 1947, Serial No. 742,255

8 Claims. (Cl. 175—183)

My invention relates to a method of and means for measuring the susceptibility of a lengthy magnetizable medium to transfer of magnetic conditions between adjacent strands thereof.

In one method of recording an intelligence, the degree of magnetization of a lengthy magnetizable medium is varied along its length in accord with the time variations of the intelligence to be recorded. During reproduction, the medium is passed across a reproducing head and the resultant time varying voltage converted to an audible or like signal to reproduce the original intelligence. In order to store a great length of the medium in a small volume and thereby permit storage of a record representing a long period of playing or recording time, it is usual in devices of this type to wind the medium on spools provided for the purpose when it is not actually in use.

It was early learned, however, that the adjacent strands of the magnetizable medium when stored on spools or similar devices tend to impart their magnetization to each other so that the actual degree of magnetization along the length of the medium tends to depart from the magnetization corresponding to the time variations in the recorded intelligence, the amount of this departure being determined by the characteristics of the medium. It has further been found that the susceptibility of a lengthy magnetizable recording medium to transfer of magnetism between adjacent strands when stored on spools or the like cannot be predicted with exactness from the measurable magnetic characteristics of the wire such as, for example, residual induction or coercive force values. It has thus been impossible to determine the susceptibility of magnetic recording mediums to transfer without use of the mediums in magnetic recording and reproducing equipment.

It is accordingly a general object of the present invention to provide an improved method of and means for measuring transfer between the adjacent strands of a magnetizable medium.

A further object of the present invention is to provide a method of and means for measuring the susceptibility of a lengthy magnetizable recording medium to transfer of the magnetism imparted thereto, which is accurate in operation and provides reproducible results to the end that results achieved with one medium may be compared with the results with another medium.

It is yet another object of the present invention to provide a method of and means for measuring the susceptibility of a lengthy magnetizable medium to transfer of magnetism between adjacent portions which provides a measurement faithfully representing this characteristic of the medium and which is a direct figure of merit as to this characteristic without further mathematical operations or reference to other characteristics.

Further it is an object of the present invention to provide a device for measuring the susceptibility of a lengthy magnetizable medium to transfer of magnetization between adjacent strands, which device is simple in construction and reliable in operation to the end that it be of maximum utility both in routine production measurement of this characteristic of the medium and in laboratory studies to ascertain the various factors affecting the transfer characteristic of the medium.

The novel features which I believe to be characteristic of my invention are set forth with particularity in the appended claims. My invention, itself, however, both as to its organization and method of operation, together with further objects and advantages thereof may best be understood by reference to the following description taken in connection with the accompanying drawings:

On the drawings:

Figure 1 is a side elevational view of a mechanism constructed in accordance with the principles of the present invention and shows in somewhat diagrammatic fashion the electrical and magnetic elements connected thereto;

Figure 2 is a bottom plan view of the mechanical portions of the mechanism of Figure 1 and shows the disposition of the medium in the region where adjacent strands are in contact; and Figure 3 shows a typical measurement obtained from the mechanism of this invention.

As shown on the drawings:

In Figures 1 and 2 the medium to be tested is indicated at 10, this medium comprising, for example, a fine wire of steel suitable for magnetic recording and reproducing purposes. Medium 10 is wound about spools 12 and 14 so as to undergo a half turn about each spool and provide two adjacent strands of medium 10 in the region shown generally at 16. That is, medium 10 is wound about spools 12 and 14 to form a complete loop, the medium approaching spool 12 from one direction (the left in Figure 1) and leaving spool 14 from the opposite direction (the right in Figure 1). Movement is imparted to medium 10 by a motor 18, Figure 2, which is supported from mounting panel 20, by brackets 22 and which is attached to spool 15 for rotation therewith.

Spools 12 and 14 are rotatably supported from panel 20 by bearings 24. Thus, as motor 18 rotates spool 15 in the counterclockwise direction as shown in Figure 1, medium 10 is drawn from the left of the view of Figure 1, through the region 16, about spool 14, back to spool 12, through the region 16 again and then to the right-hand side of the view of Figure 1.

Region 16, where the medium 10 is looped over about itself, is provided to assure a uniform degree of intimate contact between selected portions of medium 10. To this end, a plurality of pegs or posts 26 are provided. Between these pegs, the adjacent strands of medium 10 are twisted as will be evident from the views of Figures 1 and 2. By reason of this twisting, the tension imparted to medium 10 in the region 16 by reason of rotation of spool 15 causes the adjacent strands thereof to assume closely spaced positions relative to each other. Moreover, due to this tensioning action, the degree of contact between the adjacent strands is maintained at a constant value so as to assure a uniform degree of contact in the region 16 and provide accurate results from the equipment that may be readily reproduced.

It is the function of the recorder shown generally at 28 to impart to medium 10 a predetermined degree of magnetization before it reaches region 16. To this end, an erase head 30 is provided having, for example, an iron core defining a magnetic flux path and a coil encircling that core. At one point the core has an air gap and the medium 10 is caused to pass across the core at that point so that a portion of the magnetic flux passing through the flux path defined by the core passes through the medium 10. A high frequency alternating current is passed through the coil of erase head 30 from oscillator 32, this current having a frequency of 40 kilocycles, for example. In accordance with the well known principles governing magnetization of magnetizable mediums, the high frequency magnetization imparted to medium 10 by oscillator 32 and erase head 30 removes from medium 10 any previously recorded signal or any noise associated with the previous magnetic history of the material, thereby causing medium 10 to assume a magnetically neutral condition.

Recording head 34 is similar in construction to erase head 30 and medium 10 passes thereover in like fashion so that part of the flux following the flux path defined by the head 34 passes through medium 10. The coil of recording head 34 is connected to recorder 36 and to high frequency oscillator 32. Recorder 36 consists of mechanism to cause current flow in the coil of head 34 typical of the current flow associated with actual recording of an intelligence on the medium 10. For example, recorder 36 might include an oscillator of frequency within the audible range, say 5,000 cycles. Thus as medium 10 passes by head 34, magnetization thereof is varied in accordance with a predetermined signal typical of the normally recorded signal.

It is the function of oscillator 32 to feed to head 34 a high frequency current, as for example, 40 kilocycles, superimposed upon the current from recorder 36. This high frequency current acts to avoid the distortions in the magnetization of medium 10 associated with the varying slope of the B—H curve in the region of zero flux density.

It is the function of the meter shown generally at 38 to detect and measure the magnetic conditions of medium 10 as it leaves the region 16. To this end, a pick-up head 40 is provided, this head being of construction similar to heads 30 and 34, namely, including a structure to define a magnetic flux path, a coil encircling that path, and an air gap at a point where medium 10 passes thereover. Passage of medium 10 over head 40 produces a time varying voltage in accord with the variation in magnetization of medium 10, which voltage is applied to preamplifier 42 to increase the magnitude thereof as required for the subsequent measuring instruments. After passing through amplifier 42, the time varying voltage is applied to 40 kilocycle filter 44 which removes the components thereof imparted by 40 kilocycle oscillator 32. The magnitude of the resultant voltage is measured by vacuum tube voltmeter 46.

Vacuum tube voltmeter 46 may, for example, include a "cathode follower" amplifier stage having a very high input impedance so as to avoid loading preamplifier 42 and filter 44 and a subsequent rectifier tube to convert the time varying voltage to a rectified or unidirectional voltage. An indicating type direct current meter is provided to measure this rectified current so as to provide an indication of the average value of the wave from unit 36 that reaches pick-up head 40.

The operation of the present invention may best be described with reference to Figure 3, which shows a typical measurement obtained therefrom. At the beginning of operation, erase head 30 is operating but no signal is imparted to medium 10 by recorder 36. During this time, the indication of meter 46 is a small random indication associated with "noise" in the system and has no meaning in so far as the transfer characteristic of medium 10 is concerned. If, at time A, recorder 36 is caused to operate, no change is immediately produced in the indication of meter 46 for the reason that the portion of medium 10 passing over head 40 has not been exposed in the region 16 to any portion of the medium upon which recorder 36 has operated. However, at time B, the first portion of medium 10 that has been exposed to a treated portion of medium 10 in the region 16 reaches head 40 and a corresponding indication is produced on meter 46, as will be evident from Figure 3. This indication is the consequence of the exposure of the portion of medium 10 passing over head 40 to the portion of medium 10 that has just previously been subjected to the operation of recorder 36 by head 34. Hence, this reading indicates the susceptibility of medium 10 to transfer of magnetization between the portion of medium 10 which has not been subjected to any signal and the portion of medium 10 to which a signal has been imparted.

Upon further passage of time, a point C is reached wherein the medium passing over pick-up head 40 has been subjected to signals from recorder 36. In this case, a very great reading of meter 46 results as will be evident from Figure 3. This reading is significant in that a comparison thereof with the reading between times B and C enables an evaluation of the relationship between the level of the actual recorded signal and the level of the transferred signal.

If recorder 36 is turned off at point B where signals are first observed on meter 46, the reading of voltmeter 46 is reduced at a subsequent time D to a value comparable to that between time B and time C. This is due to exposure of the portion of medium 10 actually travelling over head 40 to the portion acted upon by head 34 and recorder 36 when the latter portion made its last travel through the region 16, namely, just prior to time D.

In general, I do not prefer to use the measurement between time D and time E as a measure of the transfer although it is a reasonably accurate measurement for that purpose. Instead, I prefer to use the more accurate reading between points B and C.

Subsequent to the time E a relatively erratic signal of continually decreasing amplitude may be measured by meter 46. This signal corresponds to subsequent transfers within the region 16 and is of little value in so far as the transfer measurements are concerned.

The relationship between the reading of meter 46 during the time period C—D to the reading during the time B—C is a measure of the susceptibility of medium 16 to transfer. In general I prefer to consider this ratio in terms of decibels attenuation, a value that may be calculated from the following formula:

$$db = 20 \log_{10} \frac{V_{BC}}{V_{CD}}$$

where:

$V_{BC}$ is the reading of meter 46 in the time B—C
$V_{CD}$ is the reading of meter 46 in the time C—D I have found, for example, that with typical magnetic mediums and with head 34 operating to saturate the medium measurement in the region B—C is of the order of 35 decibels under the measurement in the time C—D.

In general, I have found that the measurement of transfer achieved by the method and equipment described herein is definitely pessimistic and hence a sound method of evaluating the susceptibility of the medium to transfer. Specifically, the greater intimacy of contact in the region 16 as compared to the adjacent turns of wire as normally stored on a spool, for example, causes the measured transfer level to be about 10 decibels greater than is possible in normally spooled wire. Moreover, it is most convenient to take transfer tests with recorder 36 and head 34 operating to magnetize medium 10 to the saturation point where the B—H curve of the medium becomes flat, whereas under actual operation the medium is saturated only a slight portion of the time. It is well known that reduction of the level of transfer signals decreases very rapidly as the signals fall below saturation and for this reason the actual degree of transfer is less than the measured value.

In the apparatus as shown in the drawings, the twist imparted to the medium 10 may be achieved by removing the middle peg 26 and winding the medium without any twist. The middle peg 26 may then be placed between the strands and twisted a full turn to achieve the configuration shown in the figures, the peg being permanently fixed in position by inserting it in a hole in panel 20 provided for the purpose.

The device of the present invention is operable with various numbers of turns or twists in the region 16, a greater transfer measurement being obtained with a greater number of turns. However, as the number of twists is increased, the tendency for the medium to snag is aggravated. I have found that in practice the single twist of the drawings is adequate to achieve a good measurement of transfer without causing the medium to tend to snag.

While I have shown a particular embodiment of my invention, it will, of course, be understood that I do not wish to be limited thereto since many modifications, both in the structures disclosed and their cooperative arrangement, may be made without departing from the spirit and scope of my invention. I, of course, contemplate by the appended claims to cover any such modifications as fall within the true spirit and scope of my invention.

I claim as my invention:

1. The method of measuring transfer of magnetization between adjacent strands of a lengthy magnetizable medium including the steps of applying a predetermined time-varying signal to a region of said medium to impart a corresponding varying magnetization along the length thereof, subjecting an untreated portion of said medium to predetermined intimate physical contact with said first region, and measuring the magnetization imparted to said last region after said contact.

2. The method of measuring transfer of magnetization between adjacent strands of a lengthy magnetizable medium including the steps of applying a predetermined signal to a region of said medium to impart a corresponding magnetization along the length thereof, said signal corresponding to an intelligence composed of a substantially single frequency wave, subjecting an untreated portion of said medium to predetermined intimate physical contact with said first region for a predetermined time interval, and measuring the magnetization imparted to said last region after said contact.

3. The method of measuring transfer of magnetization between adjacent strands of a lengthy magnetizable medium including the steps of applying a predetermined signal to a region of said medium to impart a corresponding magnetization along the length thereof, said signal corresponding to an intelligence composed of a substantially single frequency wave and being of sufficient intensity to saturate said medium, subjecting an untreated portion of said medium to predetermined intimate physical contact with said first region for a predetermined time interval, and measuring the magnetization imparted to said last region after said contact.

4. The method of measuring transfer of magnetization between adjacent strands of a lengthy magnetizable medium including the steps of applying a signal to a region of said medium to impart a corresponding magnetization along the length thereof, said signal corresponding to an intelligence composed of a substantially single frequency wave, subjecting an untreated portion of said medium to predetermined intimate physical contact with said first region for a predetermined time interval, measuring the magnetization imparted to said first region, and measuring the magnetization imparted to said last region after said contact.

5. A device to measure the susceptibility of a lengthy magnetizable medium to transfer of magnetism between adjacent portions thereof including in combination a pair of spools mounted in spaced relationship to receive a loop of said medium, a magnetizing device selectively operable to impart a predetermined magnetization to said medium, a measuring device to measure the magnetization of said medium, and mechanism to cause travel of said medium from said first device, about said spools, to said second device, said loop extending about said spools to a degree sufficient to provide an overlapping section where separate portions of said medium travel in common direction and in adjacent relationship, whereby the transfer characteristics of said medium may be evaluated by observing the measurement of said measuring device after said magnetizing device is suddenly placed in operation.

6. A device to measure the susceptibility of a lengthy magnetizable medium to transfer of magnetism between adjacent portions thereof including in combination a pair of spools mounted in spaced relationship to receive a loop of said medium, a magnetizing device selectively operable to impart a predetermined magnetization to said medium, a measuring device to measure the magnetization of said medium, mechanism to cause travel of said medium from said first device, about said spools, to said second device, said loop extending about said spools to a degree sufficient to provide an overlapping section where separate portions of said medium travel in common direction and in adjacent relationship, and a plurality of posts disposed along said overlapping section, said medium being twisted between said posts to provide a uniform intimate contact between said separate portions, whereby the transfer characteristics of said medium may be evaluated by observing the measurement of said measuring device after said magnetizing device is suddenly placed in operation.

7. A device to measure the susceptibility of a lengthy magnetizable medium to transfer of magnetism between adjacent portions thereof including in combination a recorder selectively operable to impart predetermined magnetization to said medium, a meter to indicate the magnetization of said medium, mechanism to cause travel of said medium first over said recorder and then over said meter, said mechanism including elements operative to guide said medium between said recorder and said meter and defining a loop wherein spaced points on said medium travel in adjacent relationship for a predetermined distance, whereby the transfer characteristics of said medium may be evaluated by observing the indication of said meter after said recorder is suddenly placed in operation.

8. A device to measure the susceptibility of a lengthy magnetizable medium to transfer of magnetism between adjacent portions thereof including in combination a recorder selectively operable to impart predetermined magnetization to said medium, a meter to indicate the magnetization of said medium, mechanism to cause travel of said medium first over said recorder and then over said meter, said mechanism including elements operative to guide said medium between said recorder and said meter and defining a loop wherein spaced points on said medium travel in adjacent relationship for a predetermined distance, said elements being disposed so that said medium is twisted along said distance so that the tension thereof acts to cause engagement between adjacent portions, whereby the transfer characteristics of said medium may be evaluated by observing the indication of said meter after said recorder is suddenly placed in operation.

DAVID E. WIEGAND.

REFERENCES CITED

The following references are of record in the file of this patent:

UNITED STATES PATENTS

| Number | Name | Date |
|---|---|---|
| Re. 21,927 | Brace et al. | Oct. 21, 1941 |
| 2,106,350 | Hickman et al. | Jan. 25, 1938 |
| 2,282,929 | Billstein | May 12, 1942 |
| 2,288,862 | Weitmann et al. | July 7, 1942 |
| 2,337,148 | Barnes | Dec. 21, 1943 |